United States Patent
Donohue et al.

(10) Patent No.: US 11,100,519 B1
(45) Date of Patent: Aug. 24, 2021

(54) SYSTEM AND METHODS FOR QUARANTINING SUSPECT DATA FROM INTEGRATED DATA

(71) Applicant: WALGREEN CO., Deerfield, IL (US)

(72) Inventors: Martin Donohue, Wilmette, IL (US); Keith Chambers, Wauconda, IL (US)

(73) Assignee: WALGREEN CO., Deerfield, IL (US)

( * ) Notice: Subject to any disclaimer, the term of this patent is extended or adjusted under 35 U.S.C. 154(b) by 258 days.

(21) Appl. No.: 16/122,967

(22) Filed: Sep. 6, 2018

(51) Int. Cl.
*G06Q 30/02* (2012.01)
*G06F 16/215* (2019.01)
*G06F 16/23* (2019.01)

(52) U.S. Cl.
CPC ....... *G06Q 30/0201* (2013.01); *G06F 16/215* (2019.01); *G06F 16/2365* (2019.01)

(58) Field of Classification Search
None
See application file for complete search history.

(56) References Cited

U.S. PATENT DOCUMENTS

| | | | | |
|---|---|---|---|---|
| 8,548,910 B1 * | 10/2013 | Hamilton | ............... | G06Q 40/02 705/42 |
| 2012/0035983 A1 * | 2/2012 | Taylor | .................. | G06Q 10/105 705/7.33 |
| 2017/0364860 A1 * | 12/2017 | Wilkinson | ......... | G06Q 10/0837 |
| 2018/0047078 A1 * | 2/2018 | Rosenfeld | .......... | G06Q 30/0635 |
| 2018/0089681 A1 * | 3/2018 | Fenimore | ................ | G06F 16/23 |

OTHER PUBLICATIONS

"Entrepreneurship, innovation, and corruption", Anokhin et al., Journal of Business Venturing, vol. 24, Issue 5, Sep. 2009, pp. 465-476 (Year: 2009).*

* cited by examiner

*Primary Examiner* — Thomas L Mansfield
(74) *Attorney, Agent, or Firm* — Marshall, Gerstein & Borun LLP; Randall G. Rueth

(57) ABSTRACT

Embodiments are provided for evaluating information within a master data management (MDM) system. According to certain aspects, a MDM computing device may receive a first transaction member record and a second transaction member record assigned with the same source identifier from the same data source and linked to a composite data entity. The MDM computing device may determine, in response to receiving the second transaction member record, an overlay score between the first transaction member record and the second transaction member record. The MDM computing device may generate a notification indicative of the overlay or create an overlay task for the second transaction member record based on the overlay score by (i) unlinking the second transaction member record from the composite data entity and (ii) storing the second transaction member record in a quarantine queue as a singleton record linked to a dummy composite data entity.

20 Claims, 5 Drawing Sheets

Table 300:

| Customer Source | Member IDs (Customer Source IDs) | First Name | Last Name | Middle Name | Gender | B date | Email | Address | Primary Phone | Alt1 Phone |
|---|---|---|---|---|---|---|---|---|---|---|
| Composite View | 38965832 | Kelly | Anderson | A | F | 5/18/1962 | a_email@domain.com | 55 Main Street, Melville, TN - 550019023 | 224 - 5550978 | |
| Ecommerce | 55827348292 | Kelly | Anderson | | F | 5/18/1962 | a_email@domain.com | 55 Main Street, Melville, TN - 550019023 | 224 - 5550978 | |
| Loyalty | 82374872847872 | Kelly | Anderson | | F | 5/18/1962 | | 55 Main Street, Melville, TN - 550019023 | 224 - 5550978 | |
| HCC | 1318763 | Kelly | Anderson | | F | 5/18/1962 | | 55 Main Street, Melville, TN - 550019023 | 224 - 5550978 | |
| IC+ | 3975332331 | Kelly | Anderson | A | F | 5/18/1962 | a_email@domain.com | | 224 - 5550978 | |

Labels: 310, 308, 306, 304, 302, 312

Table 330:

| Customer Source | Member IDs (Customer Source IDs) | First Name | Last Name | Middle Name | Gender | B date | Email | Address | Primary Home Phone | Alt1 Cell Phone |
|---|---|---|---|---|---|---|---|---|---|---|
| Ecommerce | 200747881 | Stanley | Howard | J | M | 3/23/1944 | b_email@domain.comm | 328 Ridge Ave., Hoka Falls, SD - 60132112 | 408 - 5554827 | 314 - 2943558 |
| Loyalty | 108550743727755 | Stanley | Howard | U | U | 3/23/1944 | b_email@domain.comm | 109 Maple Avenue, Pell Lake, MT - 39211 | 408 - 5554827 | |
| IC+ (A) | 84356237676764 (A) | Stanley | Howard | J | M | 3/23/1944 | | | 408 - 5554827 | 314 2943558 |
| IC+ (M) | 2983677645 (M) | Stanley | Howard | J | M | 3/23/1944 | b_email@domain.comm | 28754 Camden Drive, Talcosa, MN 489995423 | 408 - 5554827 | 314 - 2943558 |
| Greenway | 801711443 | Stanley | Howard | J | M | 3/23/1944 | | 28754 Camden Drive, Talcosa, MN 489995423 | 408 - 5554827 | 408 - 5554827 |
| Greenway | 800639192 | Stanley | Howard | J | M | 3/23/1944 | | 28754 Camden Drive, Talcosa, MN 489995423 | 408 - 5554827 | 408 - 5554827 |

Table 320:

| Customer Source | Member IDs (Customer Source IDs) | First Name | Last Name | Middle Name | Gender | B date | Email | Address | Primary Phone | Alt1 Phone |
|---|---|---|---|---|---|---|---|---|---|---|
| IC+ | 3975332331 | Stanley | Howard | | M | 3/23/1944 | | 328 Ridge Ave., Hoka Falls, SD - 360132112 | 732 - 5552112 | |

Label: 312

FIG. 3

SYSTEM AND METHODS FOR QUARANTINING SUSPECT DATA FROM INTEGRATED DATA

FIELD OF DISCLOSURE

This application generally relates to enhancing data quality control in a master data management (MDM) system. In particular, this application relates to quarantining suspect data from integrated data in the MDM system.

BACKGROUND

A customer data integration (CDI) system collects customer information gathered from multiple customer sources, and subsequently consolidates and/or manages the customer information. Customer information may include customer contact details (name, phone number, e-mail, etc.), customer financial data, and/or other information gathered through customer interactions. By consolidating and/or managing the customer information, the CDI system is able to identify customer records of similar or identical customer information from various customer sources that are duplicate or redundant, and thereafter merge the customer records to provide accurate, current, and comprehensive views of customer information. The consolidated customer records may then be stored in a central master database, making it easily accessible to multiple data consumers that benefit from the comprehensive views of customer information available. A company having multiple departments or divisions within the company may utilize a CDI system for example to access consolidated customer records of its customers, and may also provide value to its customers by offering products or services based on the consolidated customer records. For instance, if one customer source provides a Chicago home address record for a customer last updated on Jan. 1, 2010, and another customer source provides a Boston home address record for the same customer last updated on Jan. 1, 2017, the CDI system may update the consolidated customer record of the customer to indicate that the customer currently lives in Boston, and may subsequently send promotional offers to the customer using the Boston home address rather than the Chicago home address.

To consolidate the plurality of customer records into one consolidated customer record in its central master database, the CDI system merges or "matches" customer records of similar or identical customer information from various customer sources by "linking" customer records identifying the same customer across multiple customer sources and/or within the same customer source. Such matching is based on common or overlapping customer information. Matching customer records across various customer sources is not based on source ID because each customer source uses its own distinct source ID for customer records associated with the same customer, although matching within the same customer source may be based on the source ID since it is presumed that a single customer source issues a unique source ID for every customer record associated with each customer. As a result of the matching, a single consolidated customer record having linked customer records of similar or identical customer information from various customer sources or from the same customer source is stored in the central master database for each customer.

However, consolidating and/or managing the customer information comes with challenges. Errors related to actions taken by customer sources can lead to inaccurate data and problems within the CDI system. For instance, for various reasons, it is possible for a customer source to inadvertently assign the same source ID to two different customers.

To illustrate repercussions of this action, assume customer source "A" originally assigned a source ID "xyz" to a customer record containing customer information for Jane on Jan. 1, 2018 and the same source ID "xyz" had inadvertently been assigned by customer source "A" to a customer record containing customer information for Dave on Jan. 30, 2018 (rather than source ID "abc" that had been originally assigned to prior customer records for Dave). The customer source "A" would interpret customer information for Dave as an update to the customer information for Jane since the source ID for Dave is the same as that for Jane. This may involve creating a new customer record having Dave's customer information assigned to source ID "xyz" in its local source database.

Subsequently, the CDI system, upon detection of updates in the local source database, may receive the new customer record having Dave's customer information from the customer source "A." In this case, because Dave's customer information may drastically differ from Jane's customer information (e.g., different names, different address, etc.), and because the CDI system is configured to consolidate customer records into one consolidated customer record based on common or overlapping customer information (and not the source ID) assigned by the customer source, the CDI system automatically "unlinks" the new customer record having Dave's customer information from Jane's consolidated customer record having Jane's customer information, and subsequently "links" the new customer record assigned to source ID "xyz" having Dave's customer information to Dave's consolidated customer record, which may include other pre-existing customer records assigned to source ID "abc" received from customer source "A" having Dave's customer information.

This is problematic for several reasons. Dave's consolidated customer record now contains member records having different source IDs from the customer source "A," when in fact, the CDI system assumes that the same source ID should have been assigned by each customer source. This may flag quality control checks configured within the CDI system, as Dave's consolidated customer record and/or member record may no longer be valid.

Therefore, to address the problems above, there is an opportunity to offer an improved and enhanced CDI system to facilitate quality control of data received from customer sources. Further, there is an opportunity to facilitate quality control of information in other domains other than the customer domain.

BRIEF SUMMARY

In one embodiment, a computer-implemented method carried out by a master data management (MDM) computing device for evaluating information in one or more domains is provided. The method may include (1) receiving, by one or more processors, a first transaction member record assigned with a source identifier from a data source, the first transaction member record comprising information in one or more domains and linked with a first composite data entity; (2) receiving, by the one or more processors, a second transaction member record assigned with the source identifier from the data source, the second transaction member record including an update on the information and linked with the first composite data entity; (3) determining, by the one or more processors, in response to receiving the second transaction member record, an overlay between the first transaction member record and the second transaction member record, wherein the overlay is measured by an overlay score in accordance with an overlay rule; and at least one of: (4) generating, by the one or more processors, a notification indicative of the determined overlay; or (5) creating, by the one or more processors, an overlay task for the second transaction member record based on the overlay score by (i) unlinking the second transaction member record from the first composite data entity and (ii) storing the second transaction member record in a quarantine queue as a singleton record linked to a dummy composite data entity.

In another embodiment, a master data management (MDM) computing device for evaluating information in one or more domains is provided. The MDM computing device may include a memory configured to store non-transitory computer executable instructions and a processor configured to interface with the memory. The processor may be configured to execute the non-transitory computer executable instructions to cause the processor to: (1) receive a first transaction member record assigned with a source identifier from a data source, the first transaction member record comprising information in one or more domains and linked with a first composite data entity; (2) receive a second transaction member record assigned with the source identifier from the data source, the second transaction member record including an update on the information and linked with the first composite data entity; (3) determine, in response to receiving the second transaction member record, an overlay between the first transaction member record and the second transaction member record, wherein the overlay is measured by an overlay score in accordance with an overlay rule; and at least one of: (4) generate a notification indicative of the determined overlay; or (5) create an overlay task for the second transaction member record based on the overlay score by (i) unlinking the second transaction member record from the first composite data entity and (ii) storing the second transaction member record in a quarantine queue as a singleton record linked to a dummy composite data entity.

In another embodiment, a non-transitory computer readable medium containing a set of computer readable instructions for evaluating information in a master data management (MDM) computing device may be provided. Executing the set of computer readable instructions may configure the processor to: (1) receive a first transaction member record assigned with a source identifier from a data source, the first transaction member record comprising information in one or more domains and linked with a first composite data entity; (2) receive a second transaction member record assigned with the source identifier from the data source, the second transaction member record including an update on the information and linked with the first composite data entity; (3) determine, in response to receiving the second transaction member record, an overlay between the first transaction member record and the second transaction member record, wherein the overlay is measured by an overlay score in accordance with an overlay rule; and at least one of: (4) generate a notification indicative of the determined overlay; or (5) create an overlay task for the second transaction member record based on the overlay score by (i) unlinking the second transaction member record from the first composite data entity and (ii) storing the second transaction member record in a quarantine queue as a singleton record linked to a dummy composite data entity.

BRIEF DESCRIPTION OF DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 3 depicts an example composite data entity, and a singleton record associated with a transaction member record received from a data source, in accordance with some embodiments;

DETAILED DESCRIPTION

Figure 1:
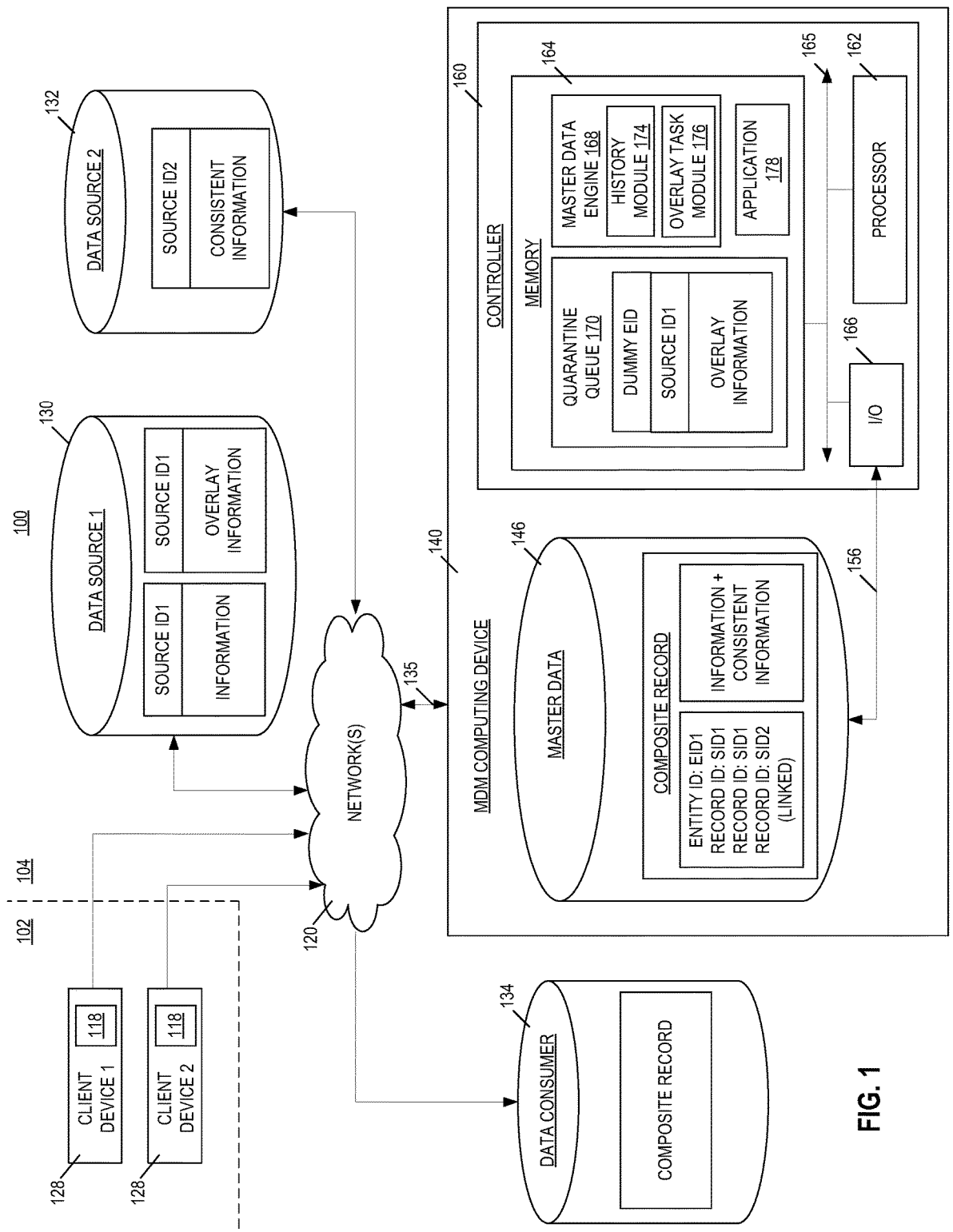
FIG. 1 illustrate various front-end and back-end devices and components of an example master data management (MDM) system for evaluating information in one or more domains, and connections therebetween, in accordance with embodiments described herein.

The systems and methods disclosed herein relate generally to enhancing data quality control in a master data management (MDM) system. According to certain aspects, the systems and methods may leverage communications and other hardware and software capabilities of electronic devices to facilitate quarantining suspect data from integrated data in the MDM system, and automatically and dynamically provide relevant information resulting from the quarantining to data source(s) that originally generated the suspect data. By identifying and preventing the suspect data from integrating with pre-existing data in the MDM system, systems and methods disclosed herein may advantageously prevent spreading of faulty or corrupted data, thereby maintaining the MDM system's integrity.

According to embodiments, a client device may communicate with a data source that may be associated with a premise, such as a server within the premise or a backend server. The premise may be part of a chain of premises associated with a single company or entity in some embodiments. The client device in combination with the data source may provide new or updated information for an individual (e.g., email, address, phone number, etc.). The client device may enable a user to enter in the information, which may subsequently be communicated to the data source. In addition to the demographic information (e.g., email, address, phone number, etc.) described above, other types of information in other domains are contemplated. For example, in a customer domain, the client device may enable a customer to enter in a retail rewards account number associated with the premise. As another example, in a provider domain or payer domain, the client device may enable a provider or payer to enter in patient medical information, such as the patient's insurance plan. In yet another example, in an employee domain, the client device may enable a human resources representative to enter in employee information, such as the manager assigned to the employee. As such, the information for an individual in various domains may be collected via the client device. Upon receiving the information from the client device, the data source may be configured to consolidate updates to the information in a local database. The local database may assign all records associated with each customer to a unique source identifier (SID).

A plurality of data sources may each share the records associated with SIDs with a MDM computing device described herein. The shared records may be stored in a master customer database. In one example, a customer may update his home address linked to his account via a client device located at a customer service desk within a premise associated with company A, and sometime later, update his email address linked to his account via the same client device located at the customer service desk. While picking up a prescription at the pharmacy, the customer may update his phone number via a client device located at the pharmacy section within the same premise or different premise. In this example, the client device located at a customer service desk may communicate both the update to his home address and email address to a local database A, which may consolidate the updates using the same unique SID designated to the customer. Similarly, the client device located at the pharmacy section may communicate the update to his phone number to a local database B. Local databases A and B may share the records associated with the customer with the MDM computing device, so that the computing device may consolidate the information (e.g., updates to home address, phone number, email, and other domain-specific information) originating from a plurality of data sources into a central composite record or entity, which has its own unique composite entity identifier (EID) for each customer.

The information received from a data source, particularly a trusted data source, is conventionally assumed to be accurate. Particularly, it is conventional that a data source assigns the unique SID per customer, and that a plurality of updates, each having the same unique SID, is intended to be updates for the same customer. However, because it is possible for a data source to erroneously assign the same SID to two different customers, which would erroneously update one customer's information with the information of the other, the MDM computing device described herein may be configured with a master data engine configured to detect overlay information in response to an update from the same data source.

Overlay information may be any update to any portion or attribute of information that already exists in the master customer database. Using the example above, had the customer never provided his phone number in the client device located at a customer service desk within a premise, master customer database may have a null entry corresponding to his phone number. Therefore, by providing a phone number in the client device located at the pharmacy section, the null entry in the master customer database may be updated with the phone number. Because the phone number replaced a null entry (i.e., not an existing prior phone number), the updated phone number is not considered overlay information. In contrast, consider a scenario in which another customer updates his home address linked to his account via the client device at a customer service desk, but rather than local database A assigning a different SID to the customer, local database A assigns the SID already assigned to the previous customer. In this case, the master customer database may have had an existing home address for the previous customer. Therefore, the update to the home address may be considered overlay information. Upon receiving the overlay information (e.g., update for a home address) for the same SID assigned to the previous customer, the master data engine described herein may be configured to detect the overlay information, and place the record that resulted in the overlay in a quarantine queue for further analysis. Subsequently, the MDM computing device may automatically and dynamically provide relevant information resulting from the quarantining to data sources that originally generated the suspect data. In this case, the local database A and/or the associated client device at the customer service desk may receive a notification that the update to the home address has been flagged as suspect data. The local database A and/or the associated client device may then correct the error, by assigning a different SID to the home address update.

The embodiments described herein therefore offer benefits to the structure and operation of the MDM computing device, which trickles down to benefits for data consumers that subscribe to the consolidated information stored by the MDM computing device. In particular, by incorporating a master data engine configured to place suspect information into a quarantine queue, the MDM computing device may improve its data integrity capabilities, as suspect information may be identified and siloed from consolidating with other properly integrated information.

The systems and methods described herein therefore address a major challenge that is particular to MDM systems. In particular, conventional MDM systems have the general inability of determining whether overlay information is proper or potentially erroneous or suspect, particularly overlay information received from trusted data sources. Similarly, the systems and methods provide improvements in a technical field, namely, e-commerce. Instead of the systems and methods merely being performed by hardware components using basic functions, the systems and methods employ complex steps that go beyond the mere concept of simply retrieving and combining data using a computer. In particular, the hardware and/or software components enable the MDM computing device to unconventionally detect overlay information and generate a notification indicative of the detected overlay information. Such notification may be transmitted to the data source that originally generated the suspect data, for example. In addition or alternative to generating the notification, upon detecting overlay information, the hardware and/or software components enable the MDM computing device to create an overlay task using a quarantine queue in response to the detection, in addition to interfacing with data sources and any data consumers to facilitate the e-commerce functionalities via network connections. This combination of elements impose meaningful limits in that the operations are applied to improve e-commerce by enabling the MDM computing device to facilitate enhanced or improved e-commerce features that utilize current network capabilities in a meaningful and effective way.

Turning now to FIG. 1, FIG. 1 illustrates an overall master data management (MDM) system 100 including various components configured to implement the various embodiments. The MDM system 100 may include a combination of hardware and software components, as well as various data communication channels for communicating information or data between and among the various hardware and software components. The MDM system 100 may be roughly divided into front-end components 102 and back-end components 104. Some of the front-end components 102 may be disposed within a business entity network that may include one or more premises. The premises may be located, by way of example rather than limitation, in separate geographic locations from each other, including different areas of the same city, different cities, or even different states. A premise in the customer domain may be a "brick and mortar" store that may include one or more physical buildings or structures, where each of the premises may accommodate shoppers and customers. An exemplary premise may include different departments or sections (e.g., photo, pharmacy, bath and beauty, and food/drink); however it should be appreciated that other types of premises and general environments are envisioned, such as websites (e.g., online stores). Each of the different departments or sections may include various components, devices, or the like. Customers or users may enter or otherwise access the premise, browse in the various departments or sections, and/or purchase any desired items/objects or services. Other types of premises are also envisioned, such as a provider's office, a payer's building, a corporate campus, or other suitable premise.

Other front-end components 102 need not be disposed within the same business entity network. For instance, some of the front-end components 102 may be disposed within a personal area network within a home.

The front-end components 102 may include a number of client devices 128 or computing devices. The client devices 128 may be local computers (e.g., kiosks) located in the various premises throughout the business entity network and may be capable of executing various applications 118 (e.g., business entity client application). The client devices 128 may also be personal computing devices (e.g., tablet computer, an Internet-enabled cell phone, a personal digital assistant (PDA), a smart phone, a laptop computer, a desktop computer, a portable media player, and/or others) accessing an on-line store or website via another network (e.g., a personal area network) using applications 118, such as a web-browser, a client application provided by a retailer, or some other client application via which a communicative connection or session may be established with a server. In some embodiments, the client device 128 may access the information associated with items/objects and/or services that are available for sale in a premise and/or stored in back-end components 104 (e.g., local databases 130, 132). A user (e.g., customer) may use the applications 118 executing at the client devices 128 to, for example, open or register a customer account, login to a customer account, provide demographic information, access information, submit images for development, look up a prescription, provide payment information, etc. Accordingly, the client devices 128 (and applications 118 executing thereon) may facilitate various features of customers' experiences within the premise(s).

A customer, provider, payer, human resource representative, or generally a user may launch the client application 118 from the client device 128, to access the data source and an associated local database. Generally, the term "user" is used when referring to a person who is operating one of the client devices 128. For example, multiple users may utilize or otherwise access a particular individual's account, such as when a provider (e.g., doctor), payer, or a human resource representative provides additional information concerning a patient or employee. As will be described below, one or both of the local databases 130, 132 may include various information about individuals, as well as basic demographic information about the individual, such as his or her name, an address, a phone number, coupons redeemed by the customer, pharmacy records of the patient, and other suitable domain-specific information. Account records are among the exemplary data that the MDM system 100 may store in the local databases 130, 132.

Those of ordinary skill in the art will recognize that the front-end components 102 may also comprise a plurality of facility servers (not shown) disposed at the plurality of premises instead of, or in addition to, a plurality of client devices 128. Each of the premises may include one or more facility servers that may facilitate communications between the client devices 128 of the premises via the network(s) 120, and may store information for a plurality of customers/employees/patients/accounts/etc. associated with each facility. Of course, a local network may also operatively connect each of the client devices 128 to the facility server. Unless otherwise indicated, any discussion of the client devices 128 may also refer to the facility servers, and vice versa. Moreover, environments other than the premises may employ the client devices 128 and the facility servers.

The front-end components 102 may communicate with the back-end components 104 via the network(s) 120. For example, the applications 118 may communicate with one or more back-end components 104 via the network 120. The network 120 may support communicative connections between applications 118 executing on the front-end components 102 and the back-end components 104, as well as between back-end components 104. For example, client devices 128 may connect to (or may detect the availability of) an access point, which may in turn connect to one or more back-end components 104 (e.g., an on-site server or a remote server) to facilitate an individual's experience within the premise. The network(s) 120 may be a proprietary network, a secure public Internet, a virtual private network or some other type of network, such as dedicated access lines, plain ordinary telephone lines, satellite links, wireless links, wired links, combinations of these, etc. Where the network 120 comprises the Internet, data communication may take place over the network 120 via an Internet communication protocol.

The backend components 104, which may include data sources (e.g., servers or other suitable electronic devices), may be configured to communicate with the client devices 128. Particularly, the data sources, via backend applications, may receive the information provided by the users via the front-end applications 118. Non-limiting examples of information may include account login credentials, demographic information, payment methods (e.g., credit card numbers), or other preferences or profiles specific to the individual (e.g., health profile, history of prescriptions, history of purchased items at the premises). The data sources may store domain-specific data received from its respective client device 128 into its local databases 130, 132. For example, if customers use the applications 118 executing at the client devices 128 to provide demographic information, the data sources may store demographic information in its local databases 130, 132. As the data sources are independent from each other, the customer data stored in local databases 130, 132 may be independent, and therefore may include redundant customer data. For example, a customer named Ronald Jones may use a client device 128 (e.g., smartphone) to provide a first set of demographics information via a first application 118 and a second set of demographics information using a second application 118. Alternatively, Ronald Jones may use a first client device 128 (e.g., kiosk at the pharmacy) to provide the first set of demographics information via first application 118 stored on the first client device 128, and a second client device 128 (e.g., kiosk at the photo department) to provide the second set of demographics information via second application 118 stored on the second client device 128. In either example, the first set of demographics information, which may be stored in local database 130 as a record tied to a unique source identifier (e.g., source ID1), and the second set of demographics information, which may be stored in local database 132 as a record tied to a unique source identifier (e.g., source ID2), may be illustrated in Table 1 and Table 2, respectively.

TABLE 1

Pharmacy Record (source ID1)

| Name | Ron R. Jones |
|---|---|
| Phone Number | (211) 278-1277 |
| Date of Birth | Jan. 29, 1983 |

TABLE 2

Photo Record (source ID2)

| Name | Ronald Jones |
|---|---|
| Phone Number | (211) 278-1727 |
| Date of Birth | Jan. 29, 1983 |

As the local databases 130, 132 may be independent from each other, the data stored in the local databases 130, 132 may collectively represent consistent customer data (e.g., DOB) and inconsistent customer data (e.g., name, phone number).

In some embodiments, the local database 130, 132 may include data other than information. For instance, the local database 130, 132 may store data such as user web profiles, object data, machine learning data, mobile device application data, web page templates and/or web pages, or other operational data that may be used to interact with the individual via application 118 through the network 120.

The backend components 104 may further include a MDM computing device 140. Generally, the MDM computing device 140 may be configured to collect information gathered from multiple data sources via the network 120, and subsequently consolidate and/or manage the information. Accordingly, data sources may act as routing or interfacing servers between the plurality of client devices 128 and a destination server, namely, the MDM computing device 140. For example, the data sources may be configured to communicate with the MDM computing device 140 and with the plurality of client devices 128 via a multitude of protocols, such as packet-switched protocols, web services, web APIs (Application Programming Interface), etc.

Particularly, the MDM computing device 140 may be configured to identify individuals across the multiple data sources to generate a composite entity that contains a consolidated view of each individual. To do so, the MDM computing device 140 may utilize an overlap batch process designed with statistical (e.g., probabilistic) measures, which can be used to compare and match potential information across the multiple data sources. The overlap batch process may identify the same individual's record across data sources by comparing demographics data (e.g., name, date of birth, address, phone number, email, social security number, gender) or other individual-identifying data contained in the information. As each data source provides a unique SID to each individual's record, the overlap batch process may not identify the same individual's record across data sources and within the same data source by comparing SIDs. To assist comparing demographics data for example, the overlap batch process may breakdown the demographics data into attributes sets, compare the demographics data within each attribute set to determine a score, and aggregate the scores across all attribute sets. Aggregate scores that exceed a predetermined threshold may be considered a match (i.e., the demographics data within one or more attribute sets are similar, if not identical).

For example, in identifying the same customer record for Ronald Jones across local databases 130, 132, the overlap batch process may breakdown the demographics data contained in the respective records into a "name" set, "phone" set, and "DOB" set. Subsequently, the overlap batch process may utilize a statistical (e.g., probabilistic) approach or algorithm to compare the demographics data within each set to determine a score. For instance, the probabilistic algorithm may weigh frequency and uniqueness of data to assign a percentage or equivalent score indicating the probability of a match. The algorithm may consider name alternatives and variables such as nicknames (e.g., Ron vs. Ronald), phonetics, transposed names, and/or use of initials. An example result of the overlap batch process analyzing the customer records for Ronald Jones across local databases 130, 132 is shown below in Table 3.

TABLE 3

Attribute Set Match Scoring

| Name Score | Phone Score | DOB Score |
|---|---|---|
| 4.8 | 3.7 | 5.3 |
| | Aggregate Score: 13.8 | |

Assuming that the overlap batch process is configured with a predetermined threshold of 12.8, the customer records for Ronald Jones across local databases 130, 132 may be identified or matched as corresponding to the same customer (i.e., Ronald Jones), as the aggregate score of 13.8 exceeds the predetermined threshold of 12.8.

The matched individual's records across the multiple data sources may be linked to the composite entity. The MDM computing device 140 may assign an EID to the composite entity, which is distinguished from each of the SIDs assigned to individual's records by the local databases 130, 132. If a composite entity already exists for an individual, the composite entity may be a single entity that links to it records containing updated information. Hence, another composite entity may not be generated for the existing individual, thereby preventing duplicate composite entities for an individual. If a composite entity does not exist for a particular individual, a new composite entity may be created to include a record of new information.

As a result, the MDM computing device 140 may collect the first and second sets of demographics information described in respective Tables 1 and 2 above, and merge the sets into a single composite entity assigned to Ronald Jones. As a result, the MDM computing device 140 may provide a true and unified view of the information, which may be consumed via the network 120, such as by local databases 130, 132. Alternatively or in addition, a data consumer 134 (e.g., server or other suitable electronic device) that is not configured to receive information directly from the client application 118 may receive a subscription of the consolidated information from the MDM computing device 140, for operational and analytical purposes, for example. Any of the local databases 130, 132 and data consumer 134 illustrated in FIG. 1 may be internal or external systems with respect to the MDM computing device 140.

Advantageously, if one local database 130 receives new or updated information (e.g., a new address after a move) from the user via client device 128, the other local database 132 may automatically be notified of the new or updated information by the MDM computing device 140 because the composite entity may have already linked new or updated information received from the local database 130. Therefore, a user need not provide the same information (e.g., the new address) to each independent application 118.

To maintain data integrity, it should be noted that some data sources may be categorized as "trusted" data sources and others may be categorized as "non-trusted" data sources. In doing so, upon receiving an updated record containing updated information from a "trusted" data source for an individual's composite entity that already contains a pre-existing record of the individual from the same "trusted" data source, it is assumed that the "trusted" data source accurately processed updated information as an updated record in its local database by assigning it the same source ID assigned to the pre-existing record.

Despite best efforts to maintain data integrity, even a 'trusted" data source may erroneously provide information to the MDM computing device 140. Consider an example scenario in which a "trusted" data source inadvertently assigns the same source ID (e.g., source ID1) used for a pre-existing record for Ronald Jones in its local database 130 to a record for a different customer, Dave Johnson. Local database 130 would interpret Dave Johnson's record as an update to the Ronald Jones' record, since the source ID for Dave Johnson's record is the same as that for Ronald Jones' record. Accordingly, Dave Johnson's record may be linked to the composite entity of Ronald Jones. The conventional MDM system, recognizing a drastic change in information, may subsequently unlink Dave Johnson's record from the composite entity of Ronald Jones and link it to the composite entity of Dave Johnson. However, the composite entity of Dave Johnson now contains faulty data (i.e., an incorrect source ID for Dave Johnson's record).

Operationally, to prevent the MDM computing device 140 from linking the new customer record having Dave Johnson's information associated with a faulty SID to Dave Johnson's composite entity, the MDM computing device 140 may first perform an overlap batch process similar to the one described above, which was used to identify customer records for the same customer across data sources. In essence, the overlap batch process described herein may not only be used to identify customer records for the same customer across data sources, but may also be used to evaluate customer records received from the same data source. As such, despite Dave Johnson's record having the same source ID as Ronald Jones' record, Dave Johnson's record may be flagged if Dave Johnson's record does not match Ronald Jones' pre-existing records that have already been consolidated in Ronald Jones' composite entity. For example, Ronald Jones' demographics information, which may be stored in local database 130 as a record tied to source ID1, and Dave Johnson's demographics information, which may be stored in local database 130 as a record tied to source ID1, may be illustrated in Table 4 and Table 5, respectively.

TABLE 4

Pharmacy Record (source ID1)

| Name | Ronald Jones |
|---|---|
| Phone Number | (211) 278-1277 |
| Date of Birth | Jan. 29, 1983 |

TABLE 5

Pharmacy Record (source ID1)

| Name | Dave Johnson |
|---|---|
| Phone Number | (323) 928-3456 |
| Date of Birth | Dec. 1, 1976 |

The overlap batch process may breakdown the demographics data contained in the respective records into a "name" set, "phone" set, and "DOB" set. Subsequently, the overlap batch process may utilize a statistical (e.g., probabilistic) approach or algorithm to compare the demographics data within each set to determine a score. An example result of the overlap batch process analyzing the customer records for Ronald Jones and Dave Johnson stored in the same local database 130 is shown below in Table 6.

TABLE 6

Attribute Set Match Scoring

| Name Score | Phone Score | DOB Score |
|---|---|---|
| −1.3 | −1.5 | −1.2 |
| | Aggregate Score: −4.0 | |

Assuming that the overlap batch process is configured with a predetermined threshold of 12.8, the customer records may be not be identified as a match, as the aggregate score of −4.0 falls below the predetermined threshold of 12.8.

Subsequently, the MDM computing device 140 may be configured to generate a notification indicative of the results of the overlap batch process. Such notification may serve to alert any of the data source(s) mentioned above. Alternatively or in addition, the MDM computing device 140 may be configured to create an overlay task for the Dave Johnson's record by (i) unlinking the Dave Johnson's record from Ronald Jones' composite entity and (ii) storing it in a quarantine queue (i.e., as opposed to linking it to Dave Johnson's composite entity) as a singleton record assigned to a dummy composite EID (i.e., not the composite EID assigned to Dave Johnson's composite entity). In doing so, the MDM computing device 140 may further prevent Dave Johnson's record from accidently being linked to Dave Johnson's composite entity. Indeed, in conventional MDM systems, Dave Johnson's record that erroneously linked to Ronald Jones' composite entity may be "unlinked" from Ronald Jones' composite entity and thereafter linked to Dave Johnson's composite entity. This is problematic in that Dave Johnson's composite entity now includes a record with an erroneous source ID, which may flag quality control checks configured within the conventional MDM system, as Dave Johnson's composite entity and/or record containing Dave Johnson's updated information may no longer be valid. Accordingly, and advantageously, the MDM computing device 140 described herein may be configured with additional security measures to prevent erroneous data from spreading, especially data received from "trusted" data sources.

Structurally, the MDM computing device 140 may include one or more databases 146. The database(s) 146 may comprise one or more data storage devices (e.g., one or more hard disk drives, optical storage drives, solid state storage devices, etc.) that are adapted to store the composite entity for each individual, which may contain records collected from multiple data sources via the network 120. The MDM computing device 140 may also maintain and update the composite entity in the database(s) 146 as additional individual's records are received from data sources. The maintained composite entities stored in the database(s) 146 may be accessible by data sources and/or data consumer 134. It should be appreciated that although the database 146 is shown as a single entity in FIG. 1, the database 146 may be implemented using any one or more databases and any one or more data storage devices.

The MDM computing device 140 may also have a controller 160 operatively connected to the database 146 via a link 156 connected to an input/output (I/O) circuit 166. It should be noted that, while not shown, additional databases may be linked to the controller 160 in a known manner. The controller 160 may include a memory 164, the processor 162 (which may be called a microcontroller or a microprocessor), and the input/output (I/O) circuit 166, all of which may be interconnected via an address/data bus 165. It should be appreciated that although only one microprocessor 162 is shown, the controller 160 may include multiple microprocessors 162. Memory 164 of the controller 160 may include multiple RAMs and program memories. Memory 164 may be implemented as semiconductor memories, magnetically readable memories, and/or optically readable memories, for example. Although the I/O circuit 166 is shown as a single block, it should be appreciated that the I/O circuit 166 may include a number of different types of I/O circuits. A link 135 may operatively connect the controller 160 to the network 120 through the I/O circuit 166.

The processor 162 may access instructions stored in memory 164 when executing various functions and tasks associated with the operation of the MDM computing device 140. Particularly, the processor 162 may be configured to execute machine-readable instructions (i.e., software), such as master data engine 168, stored in memory 164. For example, the processor 162 may execute the master data engine 168 to initiate the overlap batch process described herein to evaluate individual's records received from the same data source as well as individual's records received across multiple data sources. The master data engine 168 may be implemented in any desired language, and may be implemented as machine code, assembly code, byte code, interpretable source code or the like (e.g., via C, C++, Java, Actionscript, Objective-C, Javascript, CSS, XML, and/or others) to facilitate the functions as described herein.

Generally, to assess whether a suspect record of interest needs to be quarantined, the master data engine 168 may be configured with a history module 174 that stores prior versions of a composite entity. The history module 174 aims to reconstruct a data point in time in the past to obtain a prior image of the composite entity (prior to the update from the current record of interest).

Specifically, execution of the history module 174 may cause the processor 162 to fetch a current image of the composite entity, which may reflect incorporation of the suspect current record of interest in the composite entity. In some embodiments, the current image may include certain information, such as elements in which a difference would highly suggest a different person, such as the name, Social Security number, or phone number. In other embodiments, the current image may include other information, or all of the information, as described herein. Similarly, the processor 162 may fetch a prior image of the composite entity, which may reflect inclusion of a prior record having the same source identifier as the suspect current record of interest and exclusion of the suspect current record of interest. In an example, the prior image may be of a record associated with a time stamp earlier (e.g., a day earlier) than the one associated with the suspect record of interest. The history module 174 may be programmed to define the current image, prior image, and the time differential.

Further, execution of an overlay task module 176 may cause the processor 162 to compare the current image and the prior image associated with the same source identifier to detect whether the current image is an overlay (i.e., whether the current image includes updated portion(s) of information with respect to the prior image). The overlay task module 176 may define any suitable rule to measure any differences between the current image and the prior image. For example, the rule may define a negative score to reflect differences within the images, whereas a positive score may reflect similarities within the images. A larger negative score may reflect greater differences, and if the negative score exceeds a predetermined threshold, the overlay task module 176 may cause the processor 162 to flag the suspect record of interest to indicate that it likely does not belong within the composite entity. In Table 7, it is clear that two different people sharing the same source ID is in error.

TABLE 7

| Source | Source ID | Score | Name | SSN | Gender | Phone | DOB |
|---|---|---|---|---|---|---|---|
| Database 130 | Source ID1 | −4 | Ronald Jones | 154-12-2462 | M | (211) 278-1277 | Jan. 29, 1983 |
| Database 130 | Source ID1 | −4 | Dave Johnson | 153-23-1256 | M | (323) 928-3456 | Dec. 1, 1976 |

Accordingly, the overlay task module 176 may be configured to detect overlays by comparing updated information and original information associated with a common source ID. The overlay task module 176 may be programmed with rules that assess differences between certain data elements of the updated information relative to those of the original information, and if the differences suggest that the updated information may have been for a different individual, as indicated by an overlay score that is negative, the overlay task module 176 may flag the updated information.

Subsequently, the processor 162 may execute the overlay task module 176 to generate a notification indicative of the detected overlays and/or create an overlay task for the record (e.g., Dave Johnson's record described above) potentially including updated information for a different customer (e.g., Dave Johnson) as opposed to the customer associated with the original record (e.g., Ronald Jones). The overlay task may include (i) unlinking the suspect current record of interest from the composite entity and (ii) storing the suspect current record of interest in a quarantine queue 170 as a singleton record assigned to a dummy composite EID. The overlay task module 176 may hold the quarantined record in the quarantine queue 170, prohibiting the record from being linked to another composite entity associated with at least one pre-existing transaction member record that at least partially overlaps with the current record of interest.

In some embodiments, the overlay task module 176 may be configured to create a log file for the singleton record. The log file may include data indicative of the current image and the prior image or results of the comparison. The overlay task module 176 may transmit the log file to a data administration application 178 stored in memory 164. An administrator for the MDM computing device 140 may access the data administration application 178 to further address the potential overlay caused by the singleton record. The data administration application 178 may operate to communicate with the data sources to investigate the potential overlay. In addition, or alternatively, the overlay task module 176 may transmit, via the network 120 the log file to the data source that originally provided the suspect record of interest. In the example above, the data source associated with local database 130 that provided the Dave Johnson record may receive the log file for further assessment. In other embodiments, the overlay task module 176 may transmit a message (instead of the log file) indicative of the singleton record to the data source that provided the suspect record of interest. One of ordinary skill in the art will appreciate that notifying the responsible data source can be in other forms other than the non-limiting examples of the log file and message described herein.

While the software is depicted in FIG. 1 as including a single master data engine 168 including two modules (i.e., 174, 1756), the software may include any number of engines or modules to accomplish tasks related to the MDM quarantining operation.

Figure 2:
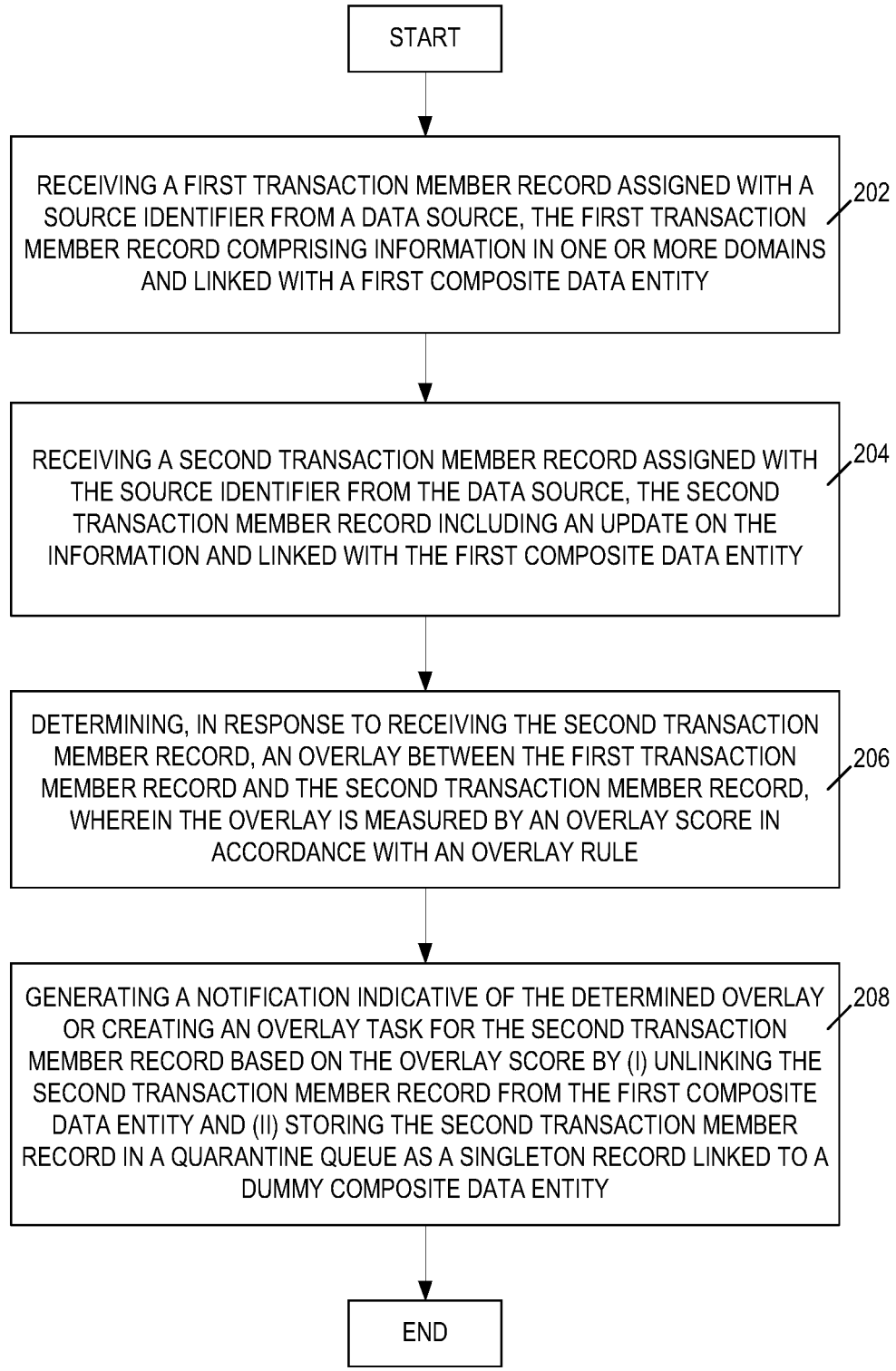
FIG. 2 depicts a flow chart of an example method for evaluating information for consolidating, in accordance with some embodiments described herein.

FIG. 2 is a flow chart of an example method 200 of evaluating information for consolidating. The method 200 may be performed by a computing device that supports master data management integration (e.g., MDM computing device 140). The computing device may be configured to communicate with data sources, such as backend servers coupled to databases (e.g., local databases 130, 132). It should be appreciated that the method 200 is merely exemplary and may include alternative or additional functionalities. For ease of illustration, method 200 will be described with reference to FIG. 3. Although FIG. 3 is illustrated with reference to information in the customer domain, it should be contemplated that other domains are also possible.

The method 200 may begin when the computing device receives (e.g., via processor 162) a first transaction member record assigned with a source identifier from a data source, as shown in block 202. The first transaction member record may include information for a particular individual, and may be linked with a composite data entity. The composite data entity may be stored in a local database associated with the data source. As illustrated in the example shown in FIG. 3, the computing device may receive a first transaction member 302 assigned with a source identifier "3975332331" from data source, IC+. The first transaction member 302 may include information for Kelly Anderson, including her first name, middle name, last name, gender, DOB, email, and address, a primary phone number, and an alternative phone number. In this example, the computing device may support master data management integration with a plurality of data sources, in addition to IC+, including Ecommerce, Loyalty, and HCC. As each data source is independent from each other and accordingly designates its own unique source identifier to the customer, the computing device may similarly receive first transaction member records 304-308 assigned with respective distinct source identifiers from the plurality of data sources. However, as the computing device is configured to identify records for each individual across the multiple data sources to generate a composite entity 310 that contains a single consolidated view of the individual, the computing device may associate, or link, the first transaction member records 302-308 received from each data source with the same composite data entity 300, and assign a composite view EID (e.g., 38965832) to the composite data entity 300.

When the data source receives changes or updates in information from the user, the data source may add a second transaction member record assigned to the same source ID as assigned to the first transaction member record in its local source database, thereby preserving a history of changes in information. The MDM system may scan the local source database periodically or aperiodically for any updates in the local source database, or may otherwise receive update messages from the data source. Upon detection of updates, and referring back to FIG. 2, the computing device may then receive (e.g., via processor 162) a second transaction member record assigned with the same source identifier from the same data source, as shown in block 204. The second transaction member record may include an update on the information and may be linked with the same composite data entity. As illustrated in the example shown in FIG. 3, the computing device may receive a second transaction member record 312 assigned with the same source identifier "3975332331" from data source, IC+, as had been assigned to the first transaction member 302.

Figure 4:
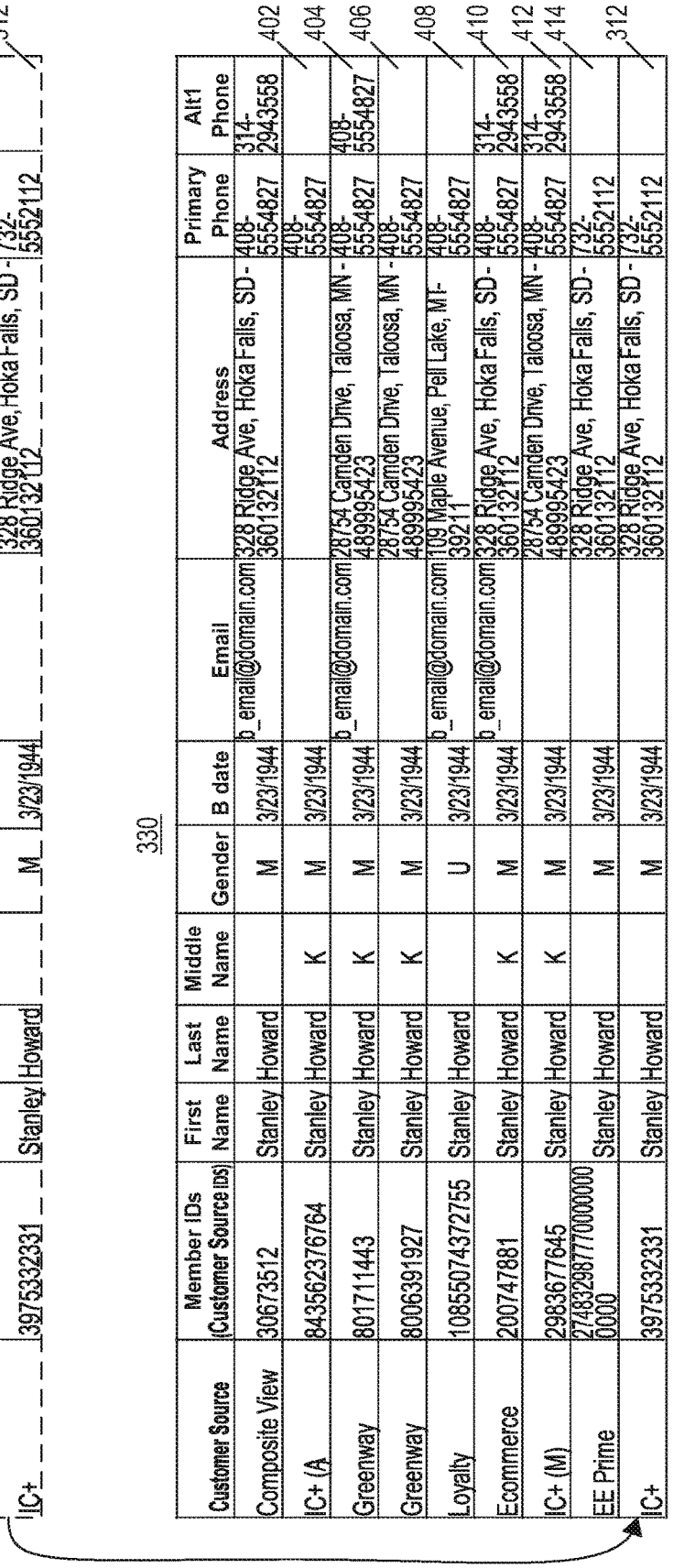
FIG. 4 depicts a composite data entity that is conventionally updated with a transaction member record received from a data source.

Conventionally, upon receiving the second transaction member record 312 (erroneously assigned the same source identifier of the first transaction member 302) and linking the second transaction member record 312 to Kelly Anderson's composite data entity 300, a typical MDM system would determine that Kelly Anderson's information drastically changed. That is, multiple fields (e.g., first name, middle name, last name, middle name, gender, DOB, address, and primary phone information) corresponding to Kelly Anderson's identity have been changed with those of a different customer, namely Stanley Howard. Further, as shown in FIG. 4, the typical MDM system would unlink the second transaction member record 312 from Kelly Anderson's composite data entity 300 and link it to Stanley Howard's composite data entity 330 because the information contained in second transaction member record 312 matches those in pre-existing transaction member records (e.g., 402-414). Stanley Howard's composite data entity 330 now includes a record with an erroneous source ID, which may flag quality control checks configured within the conventional MDM system, as Stanley Howard's composite data entity 330 and/or record 312 containing Stanley Howard's updated information may no longer be valid.

To overcome such limitations in the conventional MDM system, and referring back to FIG. 2, the computing device described herein may determine (e.g., via a processor), in response to receiving the second transaction member record and linking it to the composite data entity, an overlay between the first transaction member record and the second transaction member record, as shown in block 206. The overlay may be measured by an overlay score in accordance with an overlay rule. As illustrated in the example shown in FIG. 3, the computing device may determine that the second transaction member record 312 is suspected to be a potential overlay relative to the first transaction member record 302, in accordance with an overlay rule that measures differences between the first transaction member record 302 and the second transaction member record 312. For example, the overlay rule may define a negative score to reflect differences within records, whereas a positive score may reflect similarities within the records. A larger negative score may reflect greater differences, and if the negative score exceeds a predetermined threshold, the computing device may flag the second transaction member record 312 to indicate that it likely does not belong with the first transaction member record 302 within composite data entity 300. The overlay rule may be similar to the overlap batch process described above with respect to FIG. 1, in that it may breakdown the information into attributes sets, compare the information within each attribute set to determine a score, and aggregate the scores across all attribute sets.

Referring back to FIG. 2, after the computing device determines that the second transaction member record is suspected to be a potential overlay relative to the first transaction member record based on a negative overlay score, the computing device may then generate a notification indicative of the potential overlay and/or create (e.g., via processor 162) an overlay task for the second transaction member record by unlinking the second transaction member record from the composite data entity and storing the second transaction member record in a quarantine queue as a singleton record, as shown in block 208. The singleton record may be linked to a dummy composite data entity. As illustrated in the example shown in FIG. 3, the computing device may create an overlay task for the second transaction member record 312 by (i) unlinking the second transaction member record 312 from the composite data entity 300 and (ii) storing the second transaction member record 312 in a quarantine queue as a singleton record 320. Importantly, the second transaction member record 312 is not associated or linked with Stanley Howard's composite data entity 330, despite having information that overlaps with pre-existing records contained within Stanley Howard's composite data entity 330. Therefore, and advantageously, the second transaction member record 312 may be siloed from Stanley Howard's composite data entity 330, unlike as shown in FIG. 4.

Figure 5:
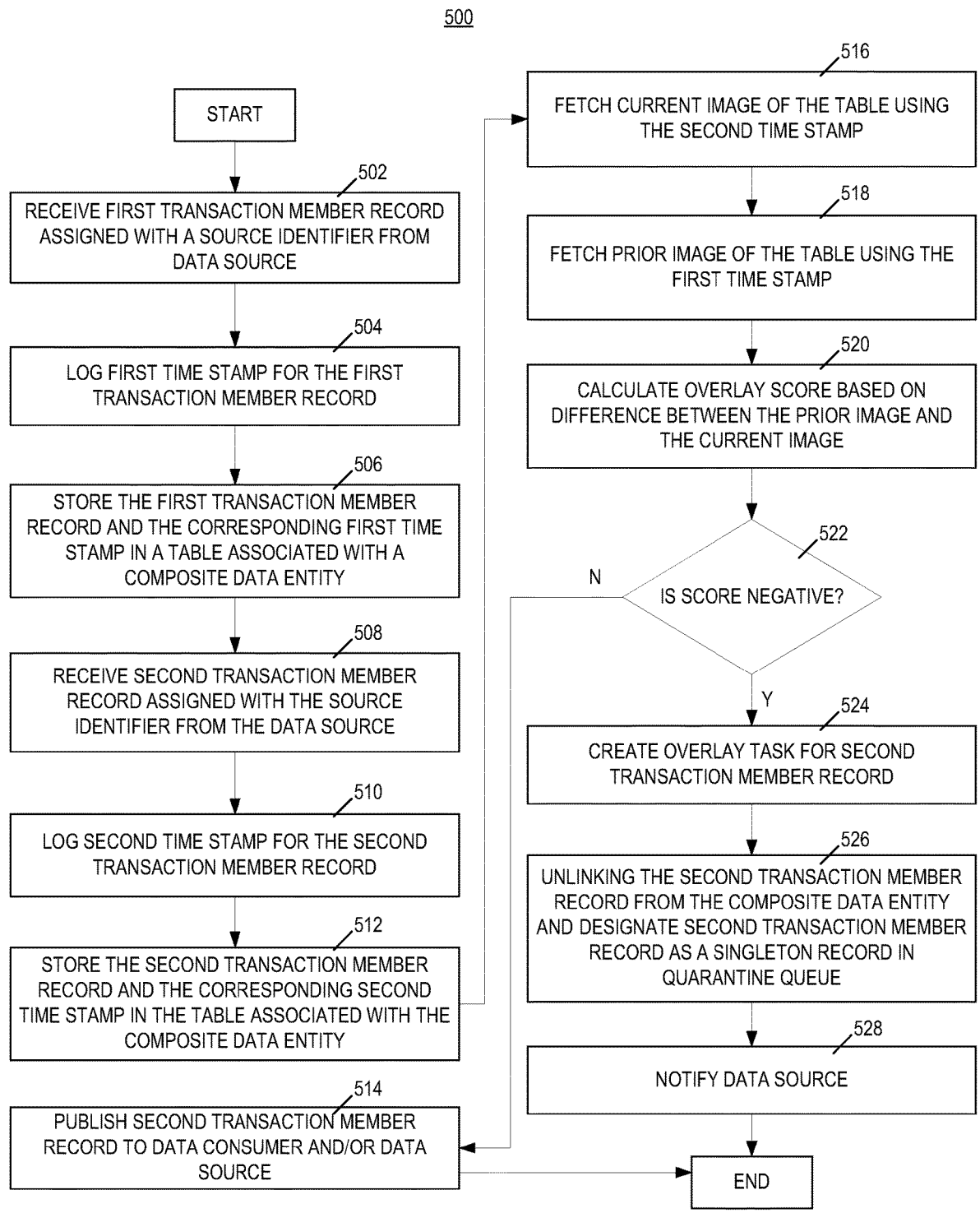
FIG. 5 depicts another flow chart of an example method for evaluating information in one or more domains, in accordance with some embodiments described herein.

Turning now to FIG. 5, FIG. 5 is a flow chart of another example method 500 of evaluating information. The method 500 may be performed by a computing device that supports master data management integration (e.g., MDM computing device 140). The computing device may be configured to communicate with data sources, such as backend servers coupled to databases (e.g., local databases 130, 132). It should be appreciated that the method 200 is merely exemplary and may include alternative or additional functionalities.

The method 500 may begin when the computing device receives (e.g., via processor 162) a first transaction member record assigned with a source identifier from a data source, as shown in block 502. The first transaction member record, which may be associated with a composite data entity stored in a table at one or more databases 146, may include information for a particular individual (e.g., name, gender, DOB, email, address, phone number, prescription or other suitable health records, payment information, customer account information, or any suitable information indicative of consumer behavior). In some embodiments, the first transaction member record may be the first record associated with the composite data entity. In other embodiments, the first transaction member record may be a proper update to a pre-existing record associated with the composite data entity, in that an overlay score between the first transaction member record and the pre-existing record is positive, for example.

The computing device may then log (e.g., via processor 162) a first time stamp for the first transaction member record, as shown in block 504. In some embodiments, the first time stamp may represent the time at which the data source generated the first transaction member record. In such embodiments, the data source may transmit the first time stamp (whether separately from or embedded in the first transaction member record) to the computing device. In other embodiments, the first time stamp may represent the time at which the computing device received the first transaction member record from the data source. The time may be a precise time (e.g., hh:mm:ss) or a time relative to other transaction member records, such that the computing device is enabled to determine whether other transaction member records arrived before or after the first transaction member record.

The computing device may then store (e.g., via processor 162) the first transaction member record and the corresponding first time stamp at one or more databases 146 (e.g., in a table), as shown in block 506. Specifically, the first transaction member record and the corresponding first time stamp may be stored within a composite data entity with an entity ID (EID) assigned by the computing device.

Similar to steps shown in blocks 502-506, the computing device may then receive (e.g., via processor 162) a second transaction member record assigned with the same source identifier from the same data source, as shown in block 508. The second transaction member record may include information for a particular individual (e.g., name, gender, DOB, email, address, phone number, prescription or other suitable health records, payment information, customer account information, etc.). In some embodiments, the data source may have intended the second transaction member record to include an update to the particular individual identified by the first transaction member record. In other embodiments, the data source may have intended the second transaction member record to include an update for a different individual than the one identified by the first transaction member record.

The computing device may then log (e.g., via processor 162) a second time stamp for the second transaction member record, as shown in block 510. In some embodiments, the second time stamp may represent the time at which the data source generated the second transaction member record. In such embodiments, the data source may transmit the second time stamp (whether separately from or embedded in the second transaction member record) to the computing device. In other embodiments, the second time stamp may represent the time at which the computing device received the second transaction member record from the data source. The time may be a precise time (e.g., hh:mm:ss) or a time relative to other transaction member records, such that the computing device is enabled to determine whether other transaction member records arrived before or after the second transaction member record.

The computing device may then store (e.g., via processor 162) the second transaction member record and the corresponding second time stamp at one or more databases 146 (e.g., in the same table storing the first transaction member record, or in a different table related to the table storing the first transaction member record), as shown in block 512. The second transaction member record and the corresponding second time stamp may be stored within the same composite data entity associated with the first transaction member record.

The computing device may then fetch (e.g., via processor 162) a current image of the table(s) using the second time stamp, as shown in block 516. The fetched current image may therefore include the latest updates to the composite data entity (i.e., the information included in the second transaction member record). The computing device may also fetch (e.g., via processor 162) a prior image of the table(s) using the first time stamp, as shown in block 518. The fetched prior image may exclude any updates to the composite data entity associated with the source identifier after the first time stamp (i.e., the information included in the second transaction member record). It should be appreciated that the computing device may fetch the current image before the prior image, the prior image before the current image, or simultaneously.

The computing device may then calculate (e.g., via processor 162) an overlay score based on differences between the prior image and the current image, as shown in block 520. The overlay score may be calculated in accordance with an overlay rule, which may breakdown the information into attributes sets, compare the information within each attribute set to determine a score, and aggregate the scores across all attribute sets. Aggregate scores that exceed a predetermined threshold may be considered a match (i.e., the prior image and the current image are similar, if not identical), and therefore indicated with a positive score.

The computing device may be enabled with different processes based on the overlay score. As shown in block 522, if the overlay score is positive, the computing device may determine (e.g., via processor 162) that the second transaction member record is a proper update to the first transaction member record, and subsequently publish the second transaction member record to any data consumer 134 and/or data source subscribed to receive the second transaction member record, as shown in block 514.

If the overlay score is negative (i.e., suggesting that the prior image and the current image are different), the computing device may generate (e.g., via processor 162) a notification indicative of the overlay and/or create (e.g., via processor 162) an overlay task for the second transaction member record, as shown in block 524. The overlay task aims to determine whether the second transaction member record was intended to update the first transaction member record (as it is associated with the same source identifier as the first transaction member record) or whether the second transaction member record contains suspect data (e.g., data source erroneously assigned the same source identifier to the second transaction member record). By creating the overlay task, the computing device may unlink the second transaction member record from the composite data entity and designate the second transaction member record as a singleton record in a quarantine queue. Accordingly, the second transaction member record may not be associated with the composite data entity as was the case with the first transaction member record (and therefore may not be assigned the same EID assigned to the first transaction member record). Rather, the second transaction member record may be blocked from joining the composite data entity, and instead, designated with a different EID (e.g., a dummy EID). As such, the second transaction member record may be marked for further analysis. The computing device may then notify (e.g., via processor 162) the data source that originated the second transaction member record, as shown in block 528.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computing device or system (e.g., a standalone, client or server computer system) or one or more hardware modules of a computing device or system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules may provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "embodiment" or "embodiments" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 100(f) unless traditional means-plus-function language is expressly recited, such as "means for" or "step for" language being explicitly recited in the claim(s).

What is claimed is:

1. A computer-implemented method for enhancing data quality control carried out by a master data management (MDM) computing device, the method comprising:

receiving, by one or more processors, a first transaction member record assigned with a first source identifier for a first user by a first data source, the first transaction member record comprising first information in one or more domains for the first user;

receiving, by the one or more processors, an additional transaction member record assigned with a second source identifier for the first user by a second data source;

consolidating, by the one or more processors, the first transaction member record and the additional transaction member record into a first composite data entity generated for storage in one or more databases;

receiving, by the one or more processors, a second transaction member record assigned with the first source identifier for a second user by the first data source, the second transaction member record including updated information on the first information and linked with the first composite data entity;

flagging, by the one or more processors, the second transaction member record as a suspect record for corrupting the first composite data entity after determining that an aggregated overlay score across attribute sets contained within the first information and the updated information exceeds a predetermined threshold; and creating, by the one or more processors, an overlay task for the second transaction member record based on the overlay score by (i) unlinking the second transaction member record from the first composite data entity and (ii) storing the second transaction member record in a quarantine queue as a singleton record linked to a dummy composite data entity, thereby preventing the second transaction member record from corrupting the first composite data entity.

2. The method of claim 1, wherein the overlay task prohibits the second transaction member record from being linked to a second composite data entity associated with at least one pre-existing transaction member record that at least partially overlaps with the second transaction member record.

3. The method of claim 1, wherein the aggregated overlay score is a negative overlay score, and wherein determining the overlay further comprises:

fetching a current image of the first composite data entity post-linkage with the second transaction member record;

fetching a prior image of the first composite data entity pre-linkage with the second transaction member record;

comparing the prior image and the current image; and determining, based on the comparing, that the difference between the prior image and the current image results in the negative overlay score in accordance with the overlay rule.

4. The method of claim 3, wherein the prior image comprises a time stamp that is a day earlier than that of the current image.

5. The method of claim 1, wherein the updated information on the first information comprises an update to at least one of: name information, date of birth information, address information, phone information, email information, social security number information, or gender information.

6. The method of claim 5, wherein the updated information on the first information further comprises an update to pharmaceutical prescription information.

7. The method of claim 1, further comprising:
creating a log file for the singleton, wherein the log file comprises the current image and the prior image; and
transmitting the log file to a data administration application configured to review the log file.

8. The method of claim 1, further comprising:
publishing a message indicative of the singleton linked to the dummy composite data entity; and
transmitting the message to the first data source.

9. A master data management (MDM) computing device for enhancing data quality control, comprising:
a memory configured to store non-transitory computer executable instructions; and
a processor configured to interface with the memory, wherein the processor is configured to execute the non-transitory computer executable instructions to cause the processor to:
receive a first transaction member record assigned with a first source identifier for a first user by a first data source, the first transaction member record comprising first information in one or more domains for the first user;
receive an additional transaction member record and assigned with a second source identifier for the first user by a second data source;
consolidate the first transaction member record and the additional transaction member record into a first composite data entity generated for storage in one or more databases;
receive a second transaction member record assigned with the first source identifier for a second user by the first data source, the second transaction member record including updated information on the first information and linked with the first composite data entity;
flag the second transaction member record as a suspect record for corrupting the first composite data entity after determining that an aggregated overlay score across attribute sets contained within the first information and the updated information exceeds a predetermined threshold; and
create an overlay task for the second transaction member record based on the overlay score by (i) unlinking the second transaction member record from the first composite data entity and (ii) storing the second transaction member record in a quarantine queue as a singleton record linked to a dummy composite data entity, thereby preventing the second transaction member record from corrupting the first composite data entity.

10. The MDM computing device of claim 9, wherein the overlay task prohibits the second transaction member record from being linked to a second composite data entity associated with at least one pre-existing transaction member record that at least partially overlaps with the second transaction member record.

11. The MDM computing device of claim 9, wherein the aggregated overlay score is a negative overlay score, and wherein the processor configured to determine the overlay is further configured to:
fetch a current image of the first composite data entity post-linkage with the second transaction member record;
fetch a prior image of the first composite data entity pre-linkage with the second transaction member record;
compare the prior image and the current image; and
determine, based on the comparing, that the difference between the prior image and the current image results in the negative overlay score in accordance with the overlay rule.

12. The MDM computing device of claim 11, wherein the prior image comprises a time stamp that is a day earlier than that of the current image.

13. The MDM computing device of claim 9, wherein the updated information on the first information comprises an update to at least one of: name information, date of birth information, address information, phone information, email information, social security number information, or gender information.

14. The MDM computing device of claim 12, wherein the updated information on the first information further comprises an update to pharmaceutical prescription information.

15. The MDM computing device of claim 9, wherein the non-transitory computer executable instructions further cause the processor to:
create a log file for the singleton, wherein the log file comprises the current image and the prior image; and
transmit the log file to a data administration application configured to review the log file.

16. The MDM computing device of claim 9, wherein the non-transitory computer executable instructions further cause the processor to:
publish a message indicative of the singleton linked to the dummy composite data entity; and
transmit the message to the first data source.

17. A non-transitory computer readable medium containing a set of computer readable instructions for enhancing data quality control in a master data management (MDM) computing device, that when executed by a processor, configures the processor to:
receive a first transaction member record assigned with a first source identifier for a first user by a first data source, the first transaction member record comprising first information in one or more domains for the first user;
receive an additional transaction member record and assigned with a second source identifier for the first user by a second data source;
consolidate the first transaction member record and the additional transaction member record into a first composite data entity generated for storage in one or more databases;
receive a second transaction member record assigned with the first source identifier for a second user by the first data source, the second transaction member record including updated information on the first information and linked with the first composite data entity;

flag the second transaction member record as a suspect record for corrupting the first composite data entity after determining that an aggregated overlay score across attribute sets contained within the first information and the updated information exceeds a predetermined threshold; and create an overlay task for the second transaction member record based on the overlay score by (i) unlinking the second transaction member record from the first composite data entity and (ii) storing the second transaction member record in a quarantine queue as a singleton record linked to a dummy composite data entity, thereby preventing the second transaction member record from corrupting the first composite data entity.

18. The non-transitory computer readable medium of claim 17, wherein the overlay task prohibits the second transaction member record from being linked to a second composite data entity associated with at least one pre-existing transaction member record that at least partially overlaps with the second transaction member record.

19. The non-transitory computer readable medium of claim 17, wherein the aggregated overlay score is a negative overlay score, and wherein the set of computer readable instructions, that when executed by the processor, further configures the processor to:

fetch a current image of the first composite data entity post-linkage with the second transaction member record;

fetch a prior image of the first composite data entity pre-linkage with the second transaction member record;

compare the prior image and the current image; and determine, based on the comparing, that the difference between the prior image and the current image results in the negative overlay score in accordance with the overlay rule.

20. The MDM computing device of claim 17, wherein the set of computer readable instructions, that when executed by the processor, further configures the processor to:

publish a message indicative of the singleton linked to the dummy composite data entity; and transmit the message to the first data source.

* * * * *